United States Patent [19]

Yoshimura et al.

[11] Patent Number: 5,097,102

[45] Date of Patent: Mar. 17, 1992

[54] COORDINATE INPUT APPARATUS

[75] Inventors: Yuichiro Yoshimura, Yokohama; Ryozo Yanagisawa, Matsudo; Katsuyuki Kobayashi, Tokyo; Kiyoshi Kaneko, Yokohama; Atsushi Tanaka; Shinnosuke Taniishi, both of Kawasaki; Takeshi Kamono, Yokohama, all of Japan

[73] Assignee: Canon Kabushiki Kaisha, Tokyo, Japan

[21] Appl. No.: 631,884

[22] Filed: Dec. 21, 1990

[30] Foreign Application Priority Data

Dec. 25, 1989 [JP] Japan .................................. 1-332785

[51] Int. Cl.$^5$ .............................................. G08C 21/00
[52] U.S. Cl. .......................................... 178/18; 340/706
[58] Field of Search ........................... 178/18; 340/706; 367/907

[56] References Cited

U.S. PATENT DOCUMENTS 4,980,518 12/1990 Kobayashi et al. .................... 178/18

Primary Examiner—Stafford D. Schreyer
Attorney, Agent, or Firm—Fitzpatrick, Cella, Harper & Scinto

[57] ABSTRACT

A coordinate input apparatus for detecting a vibration transmitted from a vibration input pen by a plurality of vibration sensors arranged on a vibration transmission member, and for determining coordinates of the vibration input pen from vibration propagation times required between the position of the vibration input pen to the positions of the vibration sensors, includes a vibration-isolating member formed in a peripheral portion of the vibration transmission member. The vibration-isolating member has a multi-layered structure consisting of a plurality of vibration-isolating layers formed so that a layer nearer to the vibration transmission plate has a lower acoustic impedance than that of a layer farther from the vibration transmission plate.

9 Claims, 8 Drawing Sheets

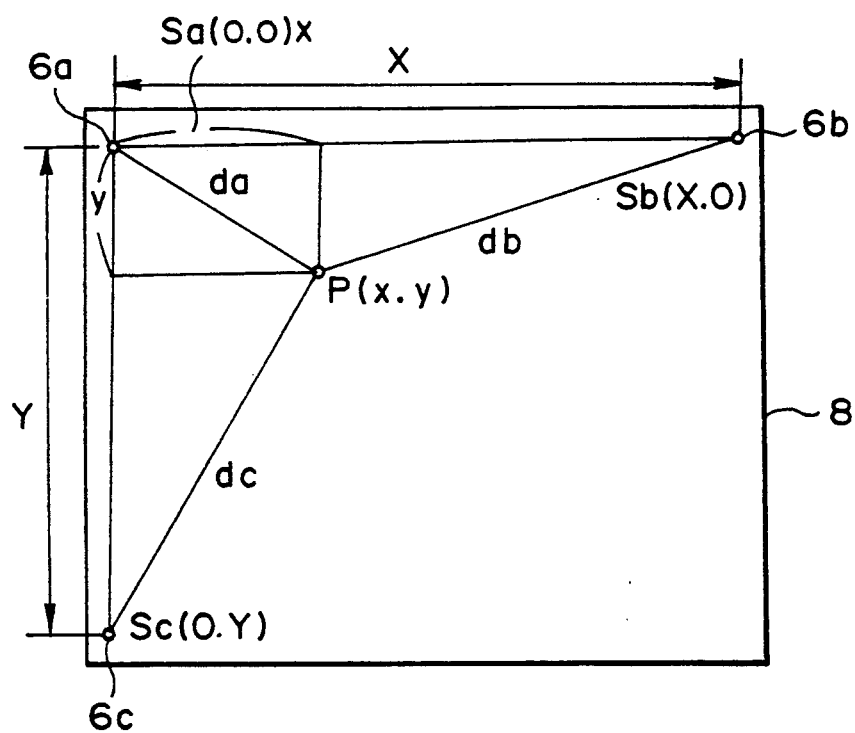
F I G. 6

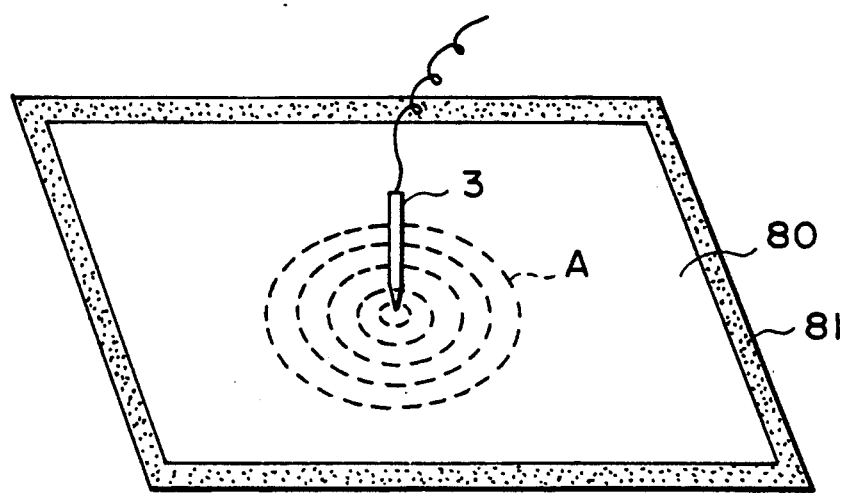
FIG. 10A
FIG. 10B
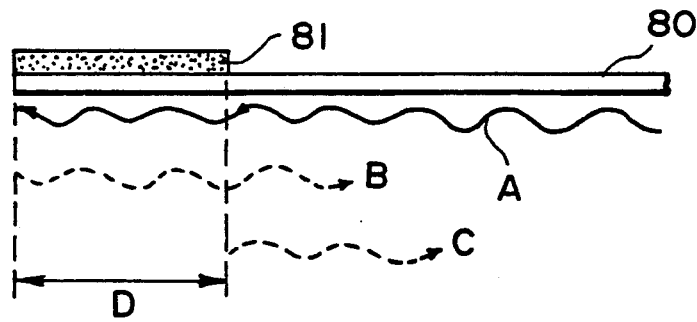
FIG. 10C

COORDINATE INPUT APPARATUS

BACKGROUND OF THE INVENTION

1. Field of the Invention

The present invention relates to a coordinate input apparatus and, more particularly, to a coordinate input apparatus for causing a plurality of vibration sensors arranged on a vibration transmission plate to detect a vibration transmitted from a vibration input pen and for detecting the position of the vibration input pen, thereby inputting coordinates.

2. Related Background Art

A conventional coordinate input apparatus is proposed wherein a vibration is input from a vibration input pen incorporating a piezoelectric element to a vibration transmission plate and is detected by a plurality of sensors arranged on the vibration transmission plate, and a vibration transmission time is measured, thereby detecting the coordinates of an input point. Such a coordinate input apparatus is disclosed in U.S. Pat. No. 4,931,965 filed by the present applicant. In this coordinate input apparatus, an end portion of the vibration transmission plate is supported by a vibration-isolating member so that an input vibration is not reflected by the end portion of the vibration transmission plate and the vibration sensor does not generate a detection error caused by the reflected wave of the input vibration.

Conventional vibration-isolating members are developed to reduce noise and are mainly classified into members for reducing noise transmitted in air and noise transmitted through a solid body. When a conventional vibration-isolating member is used for the above application purpose, the vibration-isolating member for reducing noise transmitted through a solid body is used. An example of this vibration-isolating member is a thin antivibration sheet shown in FIG. 10A or a paint.

Referring to FIG. 10A, a vibration transmission plate 80 is to be vibration-insulated by an antivibration sheet 81. The vibration transmission plate 81 comprises a metal plate (e.g., an aluminum plate), a resin plate, or a glass plate. With this arrangement, the antivibration sheet 81 is adhered to the vibrating vibration transmission plate 80 to reduce the vibration of the vibration transmission plate 80, thereby attenuating the vibration of the antivibration sheet 81 and reducing noise.

The conventional antivibration sheet 81, however, is designed to suppress the vibration of the vibration transmission plate 80 as a whole by being adhered to the entire surface of the vibration transmission plate 80. As described above, therefore, in order to suppress the reflection wave at the end portion of the vibration transmission plate 80, the reflection wave cannot be sufficiently attenuated even if the antivibration sheet 81 is adhered to the entire peripheral portion of the vibration transmission plate 80, as shown in FIG. 10B.

FIG. 10B is a view showing vibration propagation when the antivibration sheet 81 is adhered in the entire peripheral portion of the vibration transmission plate 80, and FIG. 10C is a sectional view showing a part of FIG. 10B and, more particularly, showing a state of the reflection waveform.

Referring to FIG. 10C, a waveform A represents a vibration propagating at a vibration start point as a contact point between a vibration input pen 3 and the vibration transmission plate 80, a waveform B represents a waveform reflected at an end face of the vibration transmission plate 80, and a waveform C represents a wave reflected at a boundary between the vibration transmission plate 80 and the antivibration sheet 81.

In the conventional antivibration sheet 81, a vibration-isolating effect is large for a vibration generated by the entire vibration plate (i.e., natural vibration including a resonant vibration). However, as shown in FIG. 10B, the vibration is increased in a region where the antivibration sheet 81 is not mounted, and a sufficient vibration-isolating effect for the vibration propagating from this region as a traveling wave cannot be obtained. For this reason, as shown in FIG. 10C, the vibration can be slightly attenuated in a portion D where the antivibration sheet 81 is mounted. However, the wave reflected by the end face of the vibration transmission plate 80 cannot be sufficiently suppressed.

A new wave C reflected by the boundary between the vibration transmission plate 80 and the antivibration sheet 81 is generated by mounting the conventional antivibration sheet 81. When the conventional antivibration sheet 81 is mounted in the entire peripheral portion of the vibration transmission plate 80 of the coordinate input apparatus utilizing an elastic wave, the above two reflected waves are generated. When a direct wave from a vibration source is to be detected, the reflected waves become noise, thereby degrading detection precision, resulting in inconvenience.

It is also proposed to mount a vibration-isolating member consisting of a material having a high acoustic impedance in a peripheral portion and to mount a vibration-isolating member consisting of a material having a low acoustic impedance inside. However, since the vibration-isolating members are arranged as a double structure in the widthwise direction, the entire structure of the vibration propagation body becomes bulky.

SUMMARY OF THE INVENTION

The present invention has been made in consideration of the conventional examples described above, and has as its object to provide a coordinate input apparatus capable of greatly attenuating a wave reflected by an end face of a peripheral portion of a vibration transmission plate on which an vibration-isolating member is mounted, and capable of reducing noise during vibration detection, thereby improving detection precision.

It is another object of the present invention to provide a coordinate input apparatus wherein a vibration-isolating member formed in a peripheral portion of a vibration transmission plate is constituted by a multi-layered structure of a plurality of vibration-isolating layers, and a vibration-isolating layer nearer to the vibration transmission plate has a lower acoustic impedance than that of a vibration-isolating layer farther from the vibration transmission plate, thereby reducing noise during vibration detection.

It is still another object of the present invention to provide a coordinate input apparatus wherein a vibration-isolating member formed in a peripheral portion of a vibration transmission plate is constituted by a multi-layered structure of a plurality of vibration-isolating layers, a vibration-isolating layer nearer to the vibration transmission plate has a lower acoustic impedance than that of a vibration-isolating layer farther from the vibration transmission plate, and the mounting boundary of the multi-layered vibration-isolating member nearer to the vibration transmission member has a larger width, thereby reducing noise during vibration detection.

BRIEF DESCRIPTION OF THE DRAWINGS

FIG. 6 is a view for explaining the principle of coordinate position calculation;

FIGS. 7A and 7B show an arrangement of a vibration-isolating member of the embodiment shown in FIG. 1A, in which FIG. 7A shows a case wherein a lower layer is larger than an upper layer, and FIG. 7B shows a case wherein lower and upper layers have the same size;

FIGS. 10A to 10C are views for explaining a conventional vibration transmission plate and a conventional vibration-isolating member.

DETAILED DESCRIPTION OF THE EMBODIMENTS

Preferred embodiments of the present invention will be described in detail with reference to the accompanying drawings. <Description of Apparatus Arrangement (FIGS. 1A & 1B)>

Figures 1A, 1B:
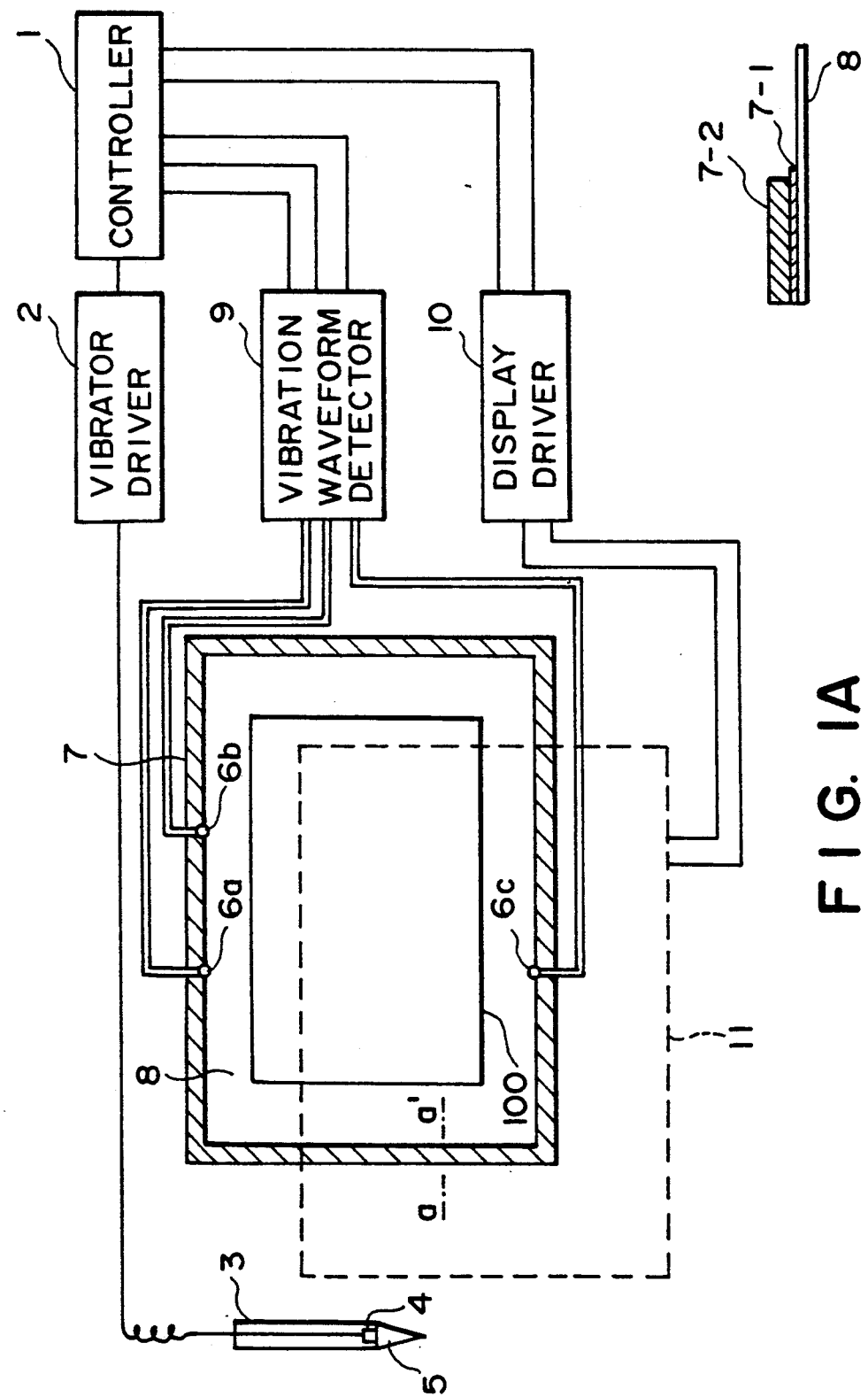
FIG. 1A is a block diagram of a coordinate input apparatus according to an embodiment of the present invention.
FIG. 1B is a sectional view showing a vibration-isolating member of the coordinate input apparatus along, the line a—a' in FIG. 1A.

FIG. 1A is a schematic block diagram showing an arrangement of a coordinate input apparatus according to an embodiment of the present invention.

Referring to FIG. 1A, a controller 1 controls the apparatus as a whole and calculates a coordinate position A vibrator driver 2 excites a vibrator 4 to vibrate the pen tip. A vibration transmission plate 8 comprises a transparent member consisting of an acrylic or glass plate. A coordinate input is entered by bringing a vibration input pen 3 into contact with the surface of the vibration transmission plate 8. More specifically, in practice, a position within an area 100 indicated by a solid line in FIG. 1A (to be referred to as an effective area) is designated with the vibration input pen 3 to input coordinates. A vibration-isolating member 7 is formed in a peripheral portion of the vibration transmission plate 8 to prevent (reduce) a reflected vibration from returning to the central portion of the vibration transmission plate 8. Vibration sensors 6a to 6c are fixed to the illustrated positions on the boundary of the vibration-isolating member 7 to convert mechanical vibrations from a piezoelectric element into electrical signals. A structure of the vibration-isolating member 7 in this embodiment will be described in detail later, and its section is illustrated in FIG. 1B. The vibration-isolating member 7 consists of an adhesive layer (lower layer) 7-1 adhered to the vibration transmission plate 8 and an upper layer 7-2.

A vibration waveform detector 9 detects vibrations sensed by the vibration sensors 6a to 6c and outputs a vibration detection signal to the controller 1. A display 11 such as a CRT (or liquid crystal display) can display information in units of dots and is located behind the vibration transmission plate 8. Upon driving of a display driver 10, dots are displayed in correspondence with points traced with the vibration input pen 3, so that the displayed dots can be observed through the vibration transmission plate 8 (because the plate 8 comprises a transparent member). In this manner, a dot is displayed at a position on the display 11 in correspondence with the detected coordinates of the vibration input pen 3.

An image constituted by elements such as dots and lines input with the vibration input pen 3 can be displayed as if it is drawn on a sheet of paper. In this manner, the locus of the vibration input pen 3 is displayed on the display 11.

With this arrangement, a menu is displayed on the display 11, and a desired item is selected from the menu with the vibration input pen 3. Alternatively, a prompt is displayed on the screen, and the vibration input pen 3 is brought into contact with a predetermined position to select a corresponding item.

Figure 2:
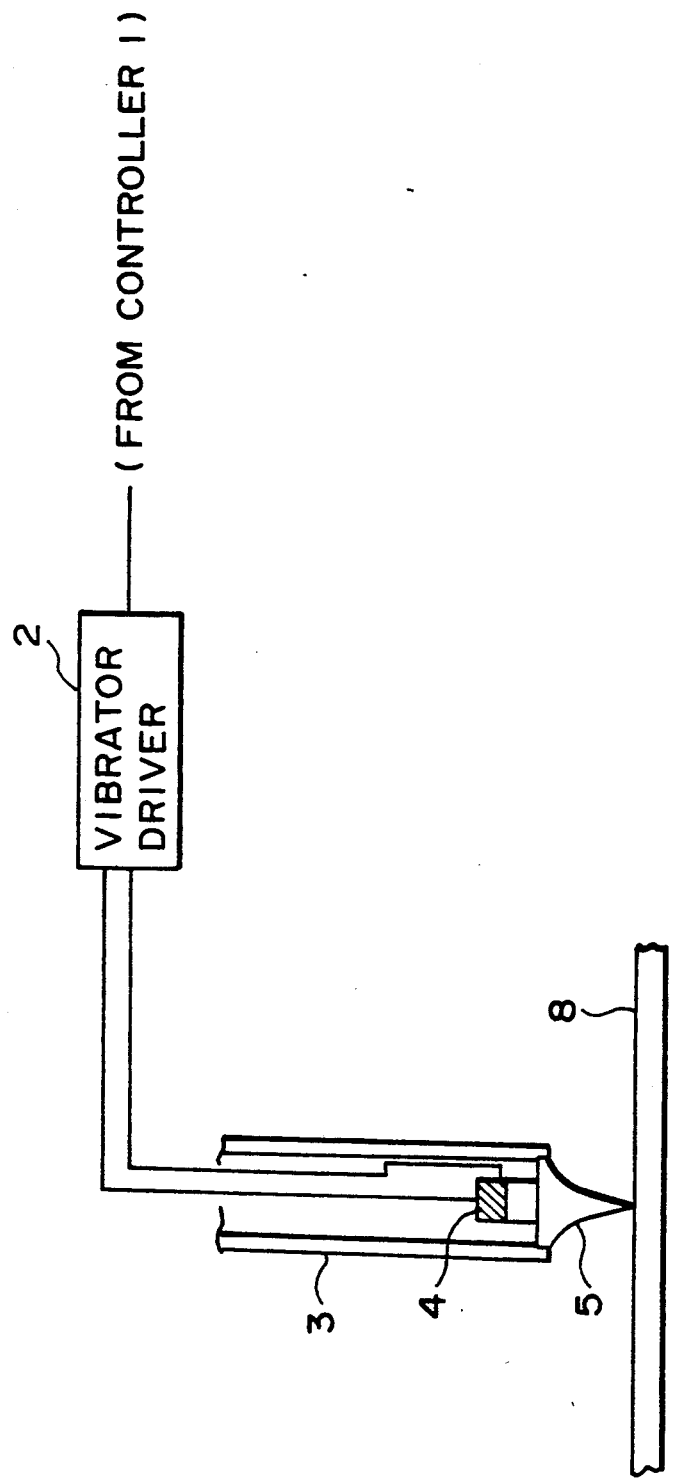
FIG. 2 is a view showing a structure of a vibration input pen according to the embodiment shown in FIG. 1A.

FIG. 2 is a view showing a structure (sectional view) of the vibration input pen 3 of this embodiment.

The vibrator 4 incorporated in the vibration input pen 3 is driven by the vibrator driver 2. A drive signal from the vibrator 4 is supplied from the controller 1 to the vibrator driver 2 as a pulse signal of low level. The pulse signal is amplified with a predetermined gain by the vibrator driver 2 capable of being driven with a low impedance. The amplified pulse signal is applied to the vibrator 4. This electrical drive signal is converted into a mechanical ultrasonic vibration by the vibrator 4, and this mechanical vibration is transmitted to the vibration transmission plate 8 through a horn portion (pen tip) 5.

A vibration frequency of the vibrator 4 is selected to be a value capable of being generated by the vibration transmission plate 8 consisting of an acrylic or glass plate. At the time of vibration of the vibrator 4, a vibration mode is selected so that the vibrator 4 is mainly vibrated in a direction perpendicular to the surface of the vibration transmission plate 8. The vibration frequency of the vibrator 4 is set to be a resonant frequency of the vibrator 4 to perform efficient electrical-vibration conversion. An elastic wave transmitted to the vibration transmission plate 8 is a wave generated by the plate and is not susceptible to flaws or obstacles on the surface of the vibration transmission plate 8 as compared with a surface wave.

The size of the vibration transmission plate 8, the mounting position of the vibration-isolating member 7, and the positions of the vibration sensors 6a to 6c in the above arrangement will be described later in detail.

In the above arrangement, the controller 1 outputs a signal for driving the vibrator 4 in the vibration input pen 3 to the vibrator driver 2 every predetermined period (e.g., every 5 ms) and causes a timer (constituted by a counter) to start. A vibration generated by the vibration input pen 3 is delayed in correspondence with distances between the vibration position and the vibration sensors 6a to 6c, and the delayed signals reach the vibration sensors 6a to 6c. The vibration waveform detector 9 detects signals from the vibration sensors 6a to 6c, and these signals are processed by waveform detection processing (to be described later) to be converted into signals representing vibration arrival timings at the vibration sensors. The controller 1 detects propagation times of vibrations sensed by the vibration sensors 6a to 6c and calculates a coordinate position of the vibration input pen 3. The controller 1 drives the display driver 10 on the basis of the calculated coordinate position information from the vibration input pen 3.

Figure 3:
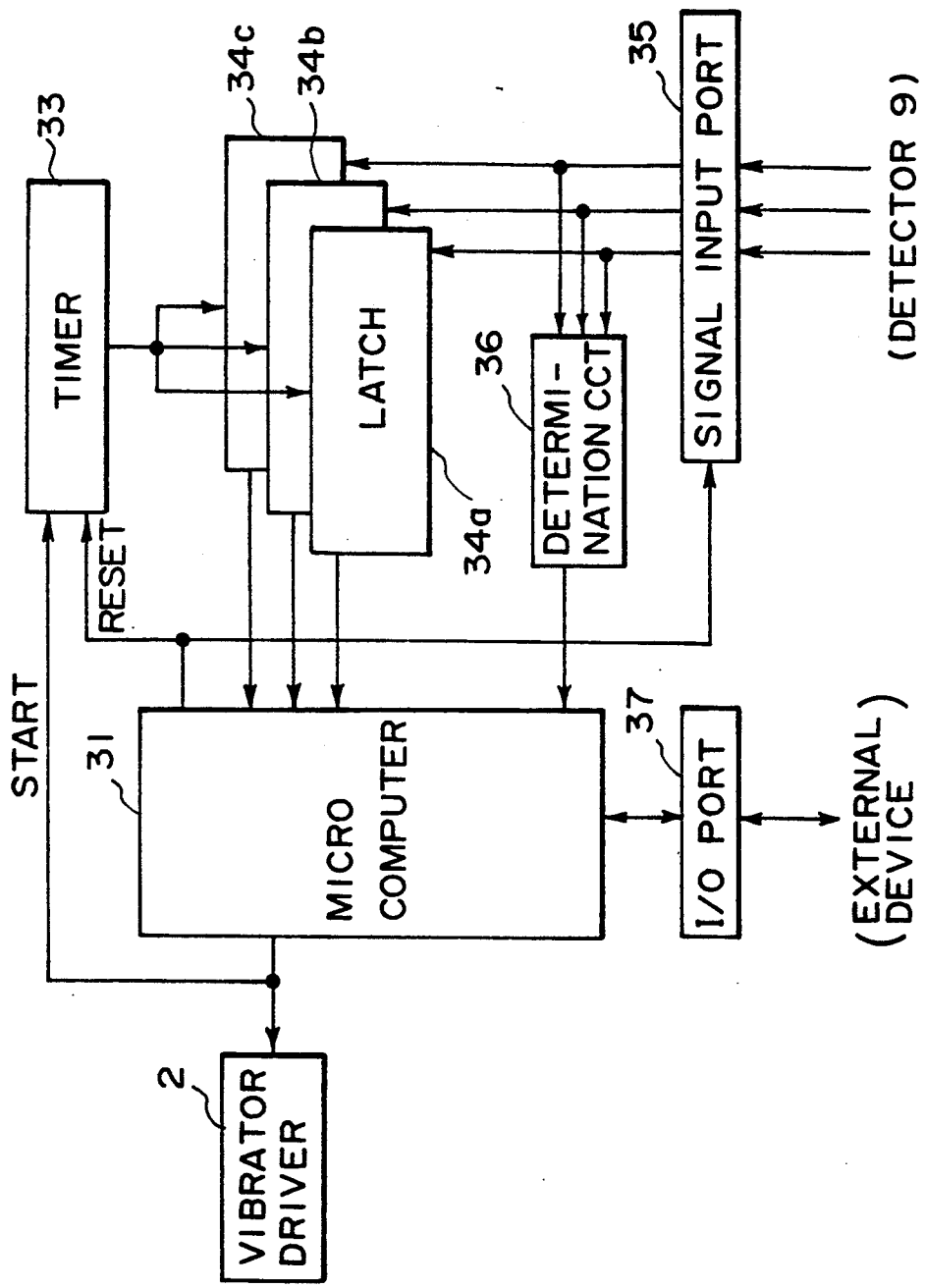
FIG. 3 is a block diagram showing an internal arrangement of a controller in the embodiment shown in FIG. 1A.

Description of Controller (FIG. 3)

FIG. 3 is a schematic block diagram showing an arrangement of the controller 1 of this embodiment. The arrangement and operation of the controller 1 will be described below.

Referring to FIG. 3, a microcomputer 31 controls the controller 1 and the coordinate input apparatus as a whole. The microcomputer 31 incorporates an internal counter, a ROM for storing operation sequences, and a RAM used as a work area. A timer (e.g., constituted by a counter) 33 counts reference clock pulses (not shown). When a start signal for starting driving of the vibrator 4 in the vibration input pen 3 is input to the vibrator driver 2, the timer 33 starts counting the reference clock pulses. The counting start time is synchronized with a timing of sensor vibration detection. Therefore, delay times elapsing until the vibration is detected by the sensors (6a to 6c) can be measured.

Circuits serving as other constituting components will be sequentially described below.

Vibration arrival timing signals derived from the vibration sensors 6a to 6c and output from the vibration waveform detector 9 are respectively input to latches 34a to 34c through a signal input port 35. The latches 34a to 34c correspond to the vibration sensors 6a to 6c, respectively. Upon reception of the timing signals from the corresponding vibration sensors, the latches 34a to 34c latch time count values of the timer 33 at corresponding moments. When a determination circuit 36 determines that all the detection signals have been received, the determination circuit 36 outputs a signal indicating this. When the microcomputer 31 receives this signal from the determination circuit 36, the vibration propagation times of the vibration to the vibration sensors are fetched from the latches 34a to 34c, and a predetermined calculation is performed to calculate a coordinate position of the vibration input pen 3 on the vibration transmission plate 8. The calculated coordinate position information is output to the display driver 10 through an I/O port 37, thereby displaying a dot corresponding to the position on the display 11.

Figure 4:
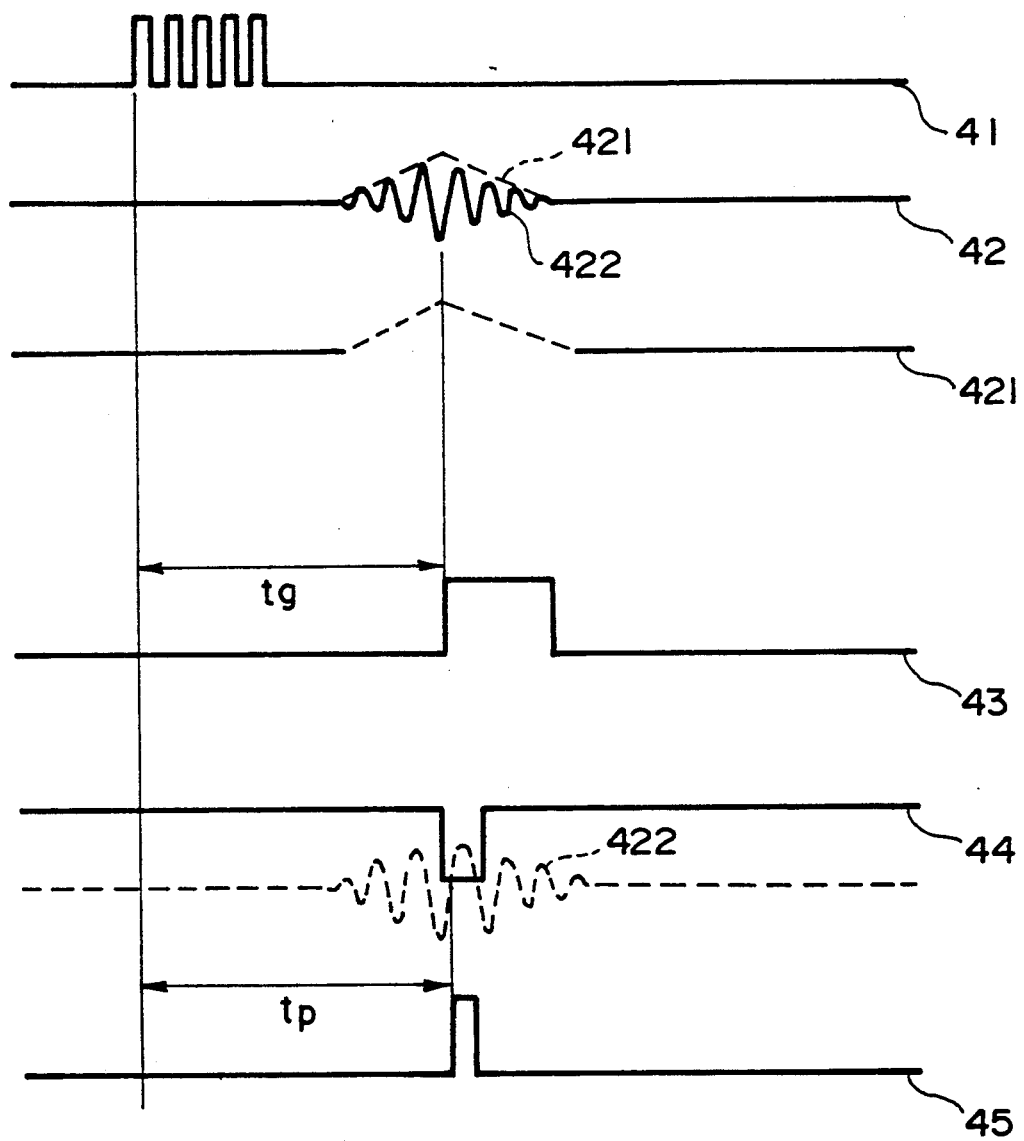
FIG. 4 is a view for explaining measurement of a distance between the vibration pen and a vibration sensor.
Figure 5:
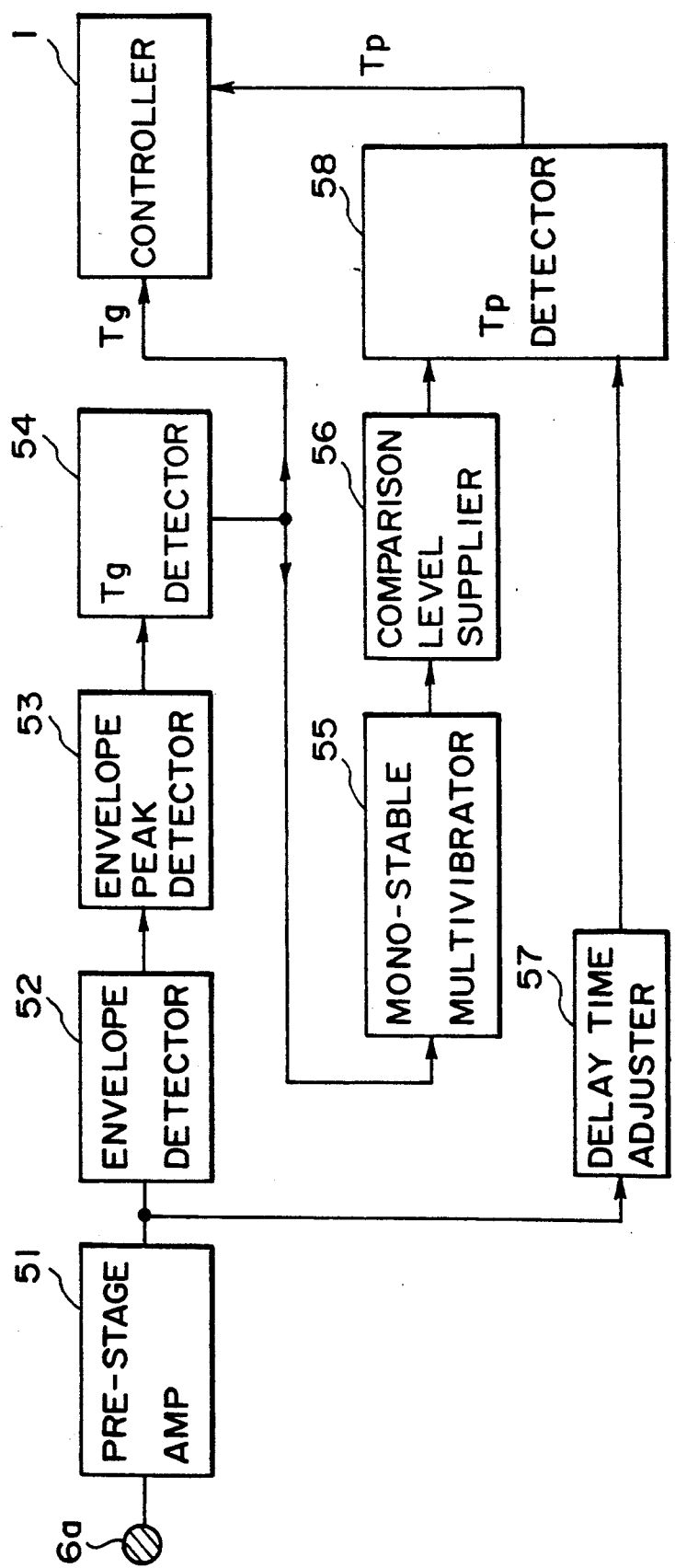
FIG. 5 is a block diagram showing an arrangement of a vibration waveform detector of the embodiment shown in FIG. 1A.

Description of Vibration Propagation Time Detection (FIGS. 4 & 5)

The principle of measuring a propagation time of a vibration to the vibration sensor 6a will be described below.

FIG. 4 is a timing chart for explaining detection waveforms input to the vibration waveform detector 9 and measurement processing of vibration propagation times based on the detection waveforms. An operation of only the vibration sensor 6a is exemplified because operations of other vibration sensors are identical with that of the vibration sensor 6a.

As described above, a measurement of a vibration propagation time of the vibration sensor 6a is started upon output of a start signal supplied to the vibrator driver 2. At this time, a drive signal 41 is applied from the vibrator driver 2 to the vibrator 4. An ultrasonic vibration transmitted from the vibration input pen 3 to the vibration transmission plate 8 in response to the drive signal 41 propagates for a time tg corresponding to a distance to the vibration sensor 6a and is detected by the vibration sensor 6a. A signal 42 represents a signal waveform detected by the vibration sensor 6a.

Since the vibration used in this embodiment is generated by a plate, a relationship between an envelope 421 and a phase 424 of the detection waveform is changed in accordance with a propagation distance within the vibration transmission plate 8. A propagation speed of the envelope 421, i.e., a group speed is given as Vg, and a phase speed of the phase 422 is given as Vp. A distance between the vibration input pen 3 and the vibration sensor 6a can be detected in accordance with a difference between the group speed Vg and the phase speed Vp.

More specifically, only the envelope 421 is taken into consideration. The speed of the envelope 421 is given as Vg, as described above. When a point on a given specific waveform, e.g., a peak, is detected as a signal 43, a distance d between the vibration pen 3 and the vibration sensor 6a is given as follows:

$$d = Vg \cdot tg \qquad (1)$$

where tg is the vibration transmission time.

This equation corresponds to the vibration sensor 6a, and distances between the vibration sensors 6b and 6c and the vibration input pen 3 can be similarly expressed.

In order to determine highly accurate coordinate values, processing based on phase signal detection is performed.

A distance between the vibration sensor and the vibration input pen is given as:

$$d = n \cdot \lambda p + Vp \cdot tp \qquad (2)$$

where tp is the time from a specific detection point of the phase waveform signal 422, e.g., a vibration start time until a zero-crossing point after a peak (the time tp is obtained by generating a window signal 44 having a predetermined width from the signal 43 and by comparing the window signal 44 with the phase signal 422), λp is the wavelength of an elastic wave, and n is an integer.

Equations (1) and (2) yield the integer n as follows:

$$n = [(vg \cdot tg - Vg \cdot tp)/\lambda p + 1/N] \qquad (3)$$

In this equation, N is a real number except for "0" and can be an appropriate number. The integer n can be determined within ±½ wavelength for N=2. A substitution of the integer n into equation (2) yields an accurate distance between the vibration input pen 3 and the vibration sensor 6a and hence accurate distances between the vibration pen 3 and the vibration sensors 6b and 6c. The signals 43 and 45 required for measurements of the two vibration propagation times tg and tp are generated by the vibration waveform detector 9. The vibration waveform detector 9 is arranged, as shown in FIG. 5.

FIG. 5 is a block diagram showing an arrangement of the vibration waveform detector 9 of this embodiment.

Referring to FIG. 5, an output signal from the vibration sensor 6a is amplified to a predetermined level by a pre-stage amplifier 51. The amplified signal is input to an envelope detector 52 constituted by a low-pass filter to extract only an envelope of the detection signal. A peak timing of the extracted envelope is detected by an envelope peak detector 53. A peak detection signal is input to a Tg detector 54 constituted by a mono-stable multivibrator, and the Tg detector 54 outputs a signal tg (i.e., the signal 43 in FIG. 4) serving as an envelope delay time detection signal having a predetermined waveform. The signal tg is input to the controller 1.

In order to supply the signal tg through a mono-stable multivibrator 55 (i.e., a circuit for generating the signal 44 in FIG. 4) and a comparison level supplier 56 and to compare the signal tg with an original signal delayed by a delay time adjuster 57, the signal tg is supplied to a Tp detector 58. The phase delay time signal tp is supplied from the Tp detector 58 to the controller 1.

The circuit arrangement described above is concerned with the vibration sensor 6a, and identical circuit arrangements are provided for other vibration sensors 6b and 6c.

If the number of sensors is generalized as h, h envelope delay time detection signals tg1 to tgh and h phase delay time detection signals tp1 to tph are input to the controller 1. The controller 1 receives the detection signals tg1 to tgh and tp1 to tph through the signal input port 35. Time count values (counts) of the timer 33 are received by the latches 34a to 34c in response to timing signals as trigger signals, respectively. As described above, since the timer 33 is started in synchronism with driving of the vibration input pen 3, envelope and phase delay time data of the vibration sensors 6a to 6c are latched by the latches 34a to 34c.

Description of Coordinate Position Calculation (FIG. 6)

The principle of actual coordinate position detection on the vibration transmission plate 8 by the vibration input pen 3 will be described below.

Coordinates Sa(O,O) of the vibration sensor 6a on the vibration transmission plate 8 are given as an origin, and coordinate positions of the vibration sensors 6b and 6c are given as Sb(X,O) and Sc(O,Y), respectively. The coordinates of the vibration input pen 3 are given as P(x,y).

If distances between the vibration input pen 3 and the vibration sensors 6a to 6c, obtained by the principle described above, are given as $d_a$ to $d_c$, the coordinates of the position P(x,y) of the vibration input pen 3 are obtained in accordance with the Pythagorean theorem as follows:

$$x = \frac{X}{2} + \frac{(d_a + d_b) \cdot (d_a - d_b)}{2X}$$

$$y = \frac{Y}{2} + \frac{(d_a + d_c) \cdot (d_a - d_c)}{2X}$$

"X" and "Y" represent horizontal and vertical distances between the vibration sensor 6a and the vibration sensors 6b and 6c.

The coordinate position of the vibration input pen 3 can be detected in real time, as described above.

Description of Vibration-Insulating Member (FIGS. 7A-9)

Figure 7A:
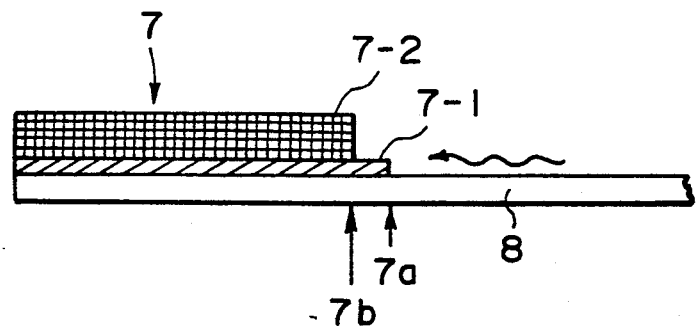
Figure 7B:
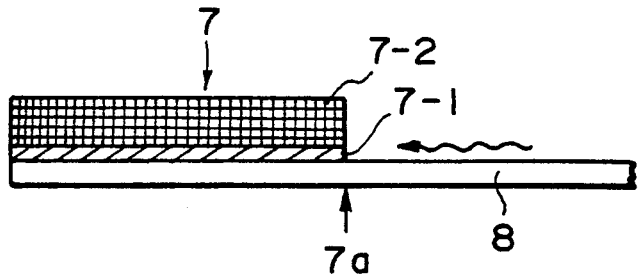

FIGS. 7A and 7B are views, respectively, showing structures of vibration-isolating members used in the coordinate input apparatus of this embodiment.

In each of FIGS. 7A and 7B, a vibration-isolating member 7-1 (to be referred to as a lower layer 7-1 hereinafter) is directly adhered to the vibration transmission plate 8, and a vibration-isolating member 7-2 (to be referred to as an upper layer 7-2 hereinafter) is stacked on the lower layer 7-1. The lower and upper layers 7-1 and 7-2 have mounting boundaries 7a and 7b, respectively. In this embodiment, the acoustic impedance of the lower layer 7-1 is lower than that of the upper layer 7-2.

In a coordinate input apparatus for detecting a vibration transmitted from the vibration input pen 3 by the plurality of vibration sensors arranged on the vibration transmission plate 8 and for detecting coordinates of the vibration input pen 3 on the vibration transmission plate 8, two functional characteristics are required for the vibration-isolating member 7. One functional characteristic is to absorb a vibration of the vibration transmission plate 8 with high efficiency and to attenuate the vibration within the vibration-isolating member 7. The other functional characteristic is to prevent generation of a new reflected wave upon mounting of the vibration-isolating member 7.

In general, when the vibration-isolating layer 7 is mounted on the vibration transmission plate 8, the amplitudes of waves reflected by the boundaries of the vibration-isolating member 7 are increased when the acoustic impedance of the vibration-isolating member 7 is increased. For example, no vibration-isolating members are mounted when the acoustic impedance is minimum. In this state, reflected waves are not generated, as a matter of course. When the thickness of the vibration transmission plate 8 having the same acoustic impedance is doubled, a wave reflected by the corresponding portion of the plate 8 is generated. This state is identical with a case wherein a material having a high acoustic impedance is mounted on the vibration transmission plate 8. Therefore, in order to reduce a wave reflected by the boundary, it is preferable to reduce the acoustic impedance of the vibration-isolating member 7. The structure of this embodiment enhances an effect of reducing mainly waves reflected by the boundaries.

In general, a material having a large attenuation effect has a high acoustic impedance, so that a material having a low acoustic impedance does not provide a sufficient attenuation effect. In order to enhance the attenuation effect of the conventional vibration-isolating member (antivibration sheet) 81 shown in FIG. 10B, the amplitude of the wave reflected by the boundary is inevitably increased in an arrangement wherein a single layer consisting of a high acoustic impedance is mounted on the vibration transmission plate. To the contrary, in the arrangement of this embodiment, the boundary (7a) where the vibration reaches belongs to the lower layer consisting of a material having a low acoustic impedance, so that the amplitude of a wave reflected by this boundary is decreased.

In the arrangement of FIG. 7A, the width of the lower layer 7-1 is larger than that of the upper layer 7-2, so that the boundary 7a is shifted to a vibration input side with respect to the boundary 7b. In the arrangement shown in FIG. 7B, the upper layer has the same width as that of the lower layer. In either case, the boundary 7a where the vibration propagating from a direction indicated by an arrow belongs to the lower layer 7-1 having a lower acoustic impedance. Therefore, the amplitude of the reflected wave is small.

The arrangement shown in FIG. 7A has a better effect of reducing the reflected wave at the boundary 7a because a change in acoustic impedances of the vibration-isolating member 7 mounted on the vibration transmission plate 8 when viewed from the vibration transmission direction is moderate (the acoustic impedance between the boundaries 7a and 7b is given by that of the lower layer 7-1).

A material for the upper layer 7-2 is constituted by the vibration-isolating member having a high acoustic impedance as in the conventional member. A material for the lower layer 7-1 is constituted by a pressure-sensitive adhesive or an adhesive (e.g., acrylic resin or a vinyl-based resin) having a lower acoustic impedance, or a double-coated tape (regardless of the presence/absence of a base) containing such a pressure-sensitive adhesive or an adhesive. By using such an adhesive material to form a lower layer, adhesion strength between the vibration transmission plate 8 and the vibration-isolating member 7 can be improved. As compared with a single layer having an upper layer having a low adhesion strength, energy transmission efficiency from the vibration transmission plate 8 to the vibration-isolating member 7 can be improved, thereby enhancing the vibration-isolating effect accordingly.

In this embodiment, the lower layer 7-1 need not be adhered to the vibration transmission plate. A material having a lower acoustic impedance than that of the material constituting the upper layer can be brought into tight contact with the vibration transmission plate by applying a force to the peripheral portion of the lower layer, thereby obtaining an effect of reducing the wave reflected by the mounting end face, as a matter of course.

ANOTHER EMBODIMENT (FIGS. 8 & 9)

Figure 8:
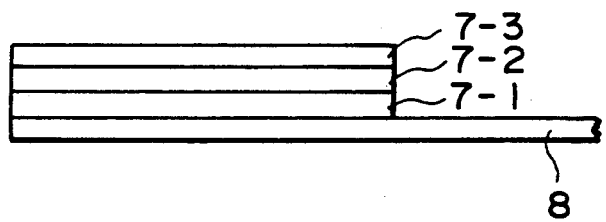
FIGS. 8 and 9 are, sectional views of vibration-isolating members according to another embodiment of the present invention.

FIG. 8 shows a structure in which the number of layers of the vibration-isolating member 7 is increased. As shown in FIG. 8, the number of layers may be three or more. In this case, when acoustic impedances of the lower, middle, and upper layers are defined as $\rho C_{7-1}$, $\rho C_{7-2}$, and $\rho C_{7-3}$, they are selected to satisfy the following condition:

$$\rho C_{7-1} < \rho C_{7-2} < \rho C_{7-3}$$

The above multi-layered structure is obtained to set a lower acoustic impedance $\rho C_{7-1}$ for the lower layer, and the wave reflected by the mounting surface can be further reduced. Even if the acoustic impedance $\rho C_{7-1}$ reduced, formation of the middle layer having the intermediate acoustic impedance $\rho C_{7-2}$ can cause improvement of vibration energy transmission efficiency and hence an increase in attenuation rate.

Figure 9:
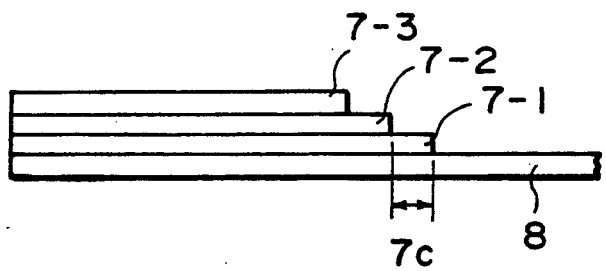

In a multi-layered structure having three or more layers, as shown in FIG. 9, the mounting boundaries are shifted toward the vibration input direction from the upper layer to the lower layer, and the antivibration effect can be improved by the same principle as that described above. More specifically, when the number of layers of the vibration-isolating member is increased and the thickness of each layer is decreased, and when a horizontal distance 7c between the mounting boundaries of the layers is increased, a rate of change in acoustic impedances at the mounting boundaries can be reduced, thereby further reducing the reflected wave.

According to this embodiment, as has been described above, a vibration wave reflected by a boundary between a vibration transmission plate and a vibration-isolating member can be reduced, and highly accurate detection of a coordinate position can be performed with the vibration input pen.

According to the present invention, as has been described above, a wave reflected at an end face of a transmission plate at its peripheral portion in which a vibration-isolating member is mounted, can be largely reduced, and noise during vibration detection can be reduced, thereby improving detection precision.

What is claimed is:

1. A coordinate input apparatus for detecting a vibration transmitted from a vibration input pen by a plurality of vibration sensors arranged on a vibration transmission member, and for determining coordinates of said vibration input pen from vibration propagation times required between a position of said vibration input pen to positions of said vibration sensors, comprising:

a vibration-isolating member formed in a peripheral portion of said vibration transmission member, said vibration-isolating member having a multi-layered structure consisting of a plurality of vibration-isolating layers formed so that a layer nearer to said vibration transmission plate has a lower acoustic impedance than that of a layer farther from said vibration transmission plate.

2. An apparatus according to claim 1, wherein a width of each layer of said vibration-isolating member is increased in the layer nearer to said vibration transmission plate.

3. An apparatus according to claim 1, wherein said layers of said vibration-isolating member are adhered to each other by an adhesive or a pressure-sensitive adhesive.

4. An apparatus according to claim 1, wherein said vibration transmission plate comprises a transparent member, and a display is arranged below said vibration transmission plate.

5. A coordinate input apparatus comprising:

a vibration input pen for inputting a vibration;

a vibration transmission member for transmitting the vibration input with said vibration input pen;

a vibration-isolating member arranged in a peripheral portion of said vibration transmission member and having a multi-layered structure consisting of a plurality of layers formed so that a layer nearer to said vibration transmission layer has a lower acoustic impedance than that of a layer farther from said vibration transmission member;

a plurality of vibration detecting means arranged on said vibration transmission member; and control means for calculating a coordinate position of said vibration input pen from vibration propagation times required between the position of said vibration input pen and positions of said plurality of vibration detecting means.

6. An apparatus according to claim 5, wherein a width of each layer of said vibration-isolating member is increased in the layer nearer to said vibration transmission plate.

7. An apparatus according to claim 5, wherein said layers of said vibration-isolating member are adhered to each other by an adhesive or a pressure-sensitive adhesive.

8. An apparatus according to claim 5, further comprising:

means for obtaining an envelope waveform signal of the vibration detected by said vibration detecting means; and means for obtaining a group waveform signal of the detected vibration; and wherein said control means calculates the vibration propagation times from the envelope waveform signal and the group waveform signal.

9. An apparatus according to claim 5, wherein said vibration transmission plate comprises a transparent member, and a display is arranged below said vibration transmission plate.

* * * * *

UNITED STATES PATENT AND TRADEMARK OFFICE
CERTIFICATE OF CORRECTION

PATENT NO. : 5,097,102

DATED : March 17, 1992

INVENTOR(S) : YUICHIRO YOSHIMURA ET AL.

It is certified that error appears in the above-identified patent and that said Letters Patent is hereby corrected as shown below:

In the Drawings:

SHEET 8 OF 8

FIGS. 10A, 10B and 10C should be labeled --PRIOR ART--.

COLUMN 1

Line 41, "plate 81" should read --plate 80--.

COLUMN 3

Line 29, "are," should read --are--.
Lines 41, 42 "<Description of Apparatus Arrange-" should read --Description of Apparatus Arrange--.
Line 42, "ment (FIGS. 1A & 1B)>" should read --ment (FIGS. 1A & 1B)--.
Line 48, "tion" should read --tion.--.

COLUMN 4

Line 66, "6ato 6c." should read --6a to 6c--.

UNITED STATES PATENT AND TRADEMARK OFFICE
CERTIFICATE OF CORRECTION

PATENT NO. : 5,097,102
DATED : March 17, 1992
INVENTOR(S) : YUICHIRO YOSHIMURA ET AL.    Page 2 of 2

It is certified that error appears in the above-identified patent and that said Letters Patent is hereby corrected as shown below:

COLUMN 7

Line 20, "tgl to tgh" should read --$tg_l$ to $tg_h$--.
Line 21, "tpl to tph" should read --$tp_l$ to $tp_h$--.
Line 23, "tgl to tgh and tpl to tph" should read --$tg_l$ to $tg_h$ and $tp_l$ to $tp_h$--.

Signed and Sealed this

Second Day of August, 1994

Attest:

BRUCE LEHMAN

Attesting Officer    Commissioner of Patents and Trademarks